US012675378B2

(12) United States Patent
Unnithan et al.

(10) Patent No.: US 12,675,378 B2
(45) Date of Patent: Jul. 7, 2026

(54) METHODS, SYSTEMS, AND COMPUTER PROGRAM PRODUCT FOR REMAPPING DATABASE SESSIONS

(71) Applicant: Oracle International Corporation, Redwood Shores, CA (US)

(72) Inventors: Chandrajith Unnithan, Redwood Shores, CA (US); Wilson Chan, Redwood Shores, CA (US); Tak Wang, Redwood Shores, CA (US)

(73) Assignee: Oracle International Corporation, Redwood Shores (CA)

( * ) Notice: Subject to any disclaimer, the term of this patent is extended or adjusted under 35 U.S.C. 154(b) by 0 days.

(21) Appl. No.: 18/893,868

(22) Filed: Sep. 23, 2024

(65) Prior Publication Data

US 2026/0086903 A1 Mar. 26, 2026

(51) Int. Cl.
| | |
|---|---|
| *G06F 16/00* | (2019.01) |
| *G06F 9/50* | (2006.01) |
| *G06F 11/20* | (2006.01) |
| *G06F 16/22* | (2019.01) |
| *G06F 16/28* | (2019.01) |

(52) U.S. Cl.
CPC ........ *G06F 11/2025* (2013.01); *G06F 9/5088* (2013.01); *G06F 16/2255* (2019.01); *G06F 16/285* (2019.01); *G06F 2209/5016* (2013.01); *G06F 2209/503* (2013.01)

(58) Field of Classification Search
None
See application file for complete search history.

(56) References Cited

U.S. PATENT DOCUMENTS

| | | | | |
|---|---|---|---|---|
| 2004/0006625 A1* | 1/2004 | Saha | ..................... | H04L 63/10 |
| | | | | 709/227 |
| 2005/0038834 A1* | 2/2005 | Souder | .................. | G06F 9/5027 |
| | | | | 707/999.203 |

OTHER PUBLICATIONS

Zhang, C., et al., "A Labeled Architecture for Low-Entropy Clouds: Theory, Practice, and Lessons," Intelligent Computing, dated Sep. 1, 2022, vol. 2022, Article ID: 9795476.
Zhu, J., et al., "Perph: A Workload Co-location Agent with Online Performance Prediction and Resource Inference," 2021 IEEE/ACM 21st International Symposium on Cluster, Cloud and Internet Computing (CCGrid). 21st IEEE/ACM International Symposium on Cluster, Cloud and Internet Computing (CCGrid ), dated May 2021.

(Continued)

*Primary Examiner* — Anhtai V Tran
(74) *Attorney, Agent, or Firm* — Vista IP Law Group, LLP

(57) ABSTRACT

Disclosed is a method, a computer program product, and a computer system for remapping database sessions by first identifying a change in the cardinality of a database instances. A plurality of co-located database sessions may be assigned to a database instance of the database based at least in part upon the change in the cardinality of the database instances. Multiple database instances of a plurality of database instances in the database that respectively have one or more co-located database sessions of the plurality of co-located database sessions may be identified based at least in part upon a co-location data structure. At least one co-located database sessions of at least one database instance of the multiple database instances may be terminated.

15 Claims, 14 Drawing Sheets

(56)　　　　　　References Cited

OTHER PUBLICATIONS

Zhang, Y., et al., "History-Based Harvesting of Spare Cycles and Storage in Large-Scale Datacenters," Proceedings of the 12th USENIX Symposium on Operating Systems Design and Implementation (OSDI '16), dated Nov. 2016, ISBN 978-1-931971-33-1.

Blocher, M., et al., "Switches for HIRE: Resource scheduling for data center in-network computing," ASPLOS '21, dated 2021.

Zhu, J., et al., "QoS-Aware Co-Scheduling for Distributed Long-Running Applications on Shared Clusters," IEEE Transactions on Parallel and Distributed Systems, vol. 9, No. 99, dated 2022.

Zhang, X., et al., "Zeus: Improving Resource Efficiency via Workload Colocation for Massive Kubernetes Clusters," Digital Object Identifier 10.1109/ACCESS.2021.3100082, dated Aug. 2021.

Zhang, Y., "Workload Consolidation in Alibaba Clusters: The Good, the Bad, and the Ugly," SoCC '22, Dated Nov. 2022, San Francisco, CA, USA, @ 2022 Association for Computing Machinery, ACM ISBN 978-1-4503-9414-7/22/11.

* cited by examiner

202A Identify A Change in Cardinality of A Database System

204A Assign Session(s) to An Instance in the Database System based on the Change 206A Identify Multiple Instances in the Database System Having Co-located Session(s) based at least in part on A Colocation Map 208A Terminate Co-located Database Session(s) in at least One of the Multiple Instances

METHODS, SYSTEMS, AND COMPUTER PROGRAM PRODUCT FOR REMAPPING DATABASE SESSIONS

COPYRIGHT NOTICE

BACKGROUND

Database users often use co-location tags for database instances to tag or identify database sessions so that these database sessions execute in exactly one database instance in a database cluster to minimize cross-instance data transfer. For example, some approaches use a tag to mark, identify, or otherwise indicate database sessions to execute in one database instance and store such tags or tagging information in a data structure (e.g., a co-location map) that may be distributed in the database cluster.

When there is a change that affects the cardinality of database service instances (e.g., a change in group memberships for database that affect the instance cardinality of the database instances of a database cluster), new connection(s) with the same co-location tag may be sent to a different database instance, rather than the original database instance, As a result, sessions identified to be handled by the same instance (e.g., database sessions with the same co-location tag) may nevertheless occur in multiple instances and thus incur the undesired cross instance transfer of data (e.g., hot data blocks). For example, some legacy approaches distribute a co-location map across multiple instances in a clustered database and use a listener process that may send new connections with the same service and co-location tag to a different database instance resulting in database sessions with the same service and/or co-location tag are split over multiple database instances.

Some legacy approaches attempt to address this problem by identifying the co-located sessions and flagging these identified sessions with a drain bit so that such sessions may be reclaimed at a safe time later. These legacy approaches suffer, however, from the slow drain process. Some other legacy approaches require the use of single-instance only semantics by using the same logical replication logic for data manipulation language (DML) operations on the same data block or different data blocks. These other legacy approaches also suffer from at least a 20% hit on performance.

Therefore, what is needed is a method, a system, and a computer program product for remapping database sessions, especially when there is a cardinality change and hence a method, system, and computer program product for remapping database sessions.

SUMMARY

Embodiments of the present disclosure provide a method, a computer program product, and a computer system for remapping database sessions. Some embodiments are directed to a method for remapping database sessions. In these embodiments, a change in the cardinality of a database may be first identified. A plurality of co-located database sessions may be assigned to a database instance of the database based at least in part upon the change in the cardinality of the database. Multiple database instances of a plurality of database instances in the database that respectively have one or more co-located database sessions of the plurality of co-located database sessions may be identified based at least in part upon a co-location data structure. At least one co-located database session of at least one database instance of the multiple database instances may be terminated.

In some of these embodiments, the one or more co-located database sessions for at least one database instance of the multiple database instances may be detected, using a checker process for the database.

In some of these embodiments, the checker process is a single centralized checker process that detects, using global data collected from the plurality of database instances, whether more than one database instance in the plurality of database instances has at least one co-located database session of the plurality of co-located database sessions. In various embodiments, a co-located database session includes a database session that has been tagged to ideally co-execute on the same computing node while this tagged database session may or may not necessarily execute on the same node.

In addition or in the alternative, the checker process comprises a plurality of local checker processes each of which receives local data from each database instance of the plurality of database instances to provide each database instance with a global view of the plurality of database instances. In some embodiments, at least one of the plurality of local checker processes detects, using the local data collected from the plurality of database instances, whether more than one database instance in the plurality of database instances has at least one co-located database session of the plurality of co-located database sessions. In some embodiments, the co-location data structure stores therein an n-tuple that further comprises a first information pertaining to a database instance of the plurality of database instances and a second information pertaining to hashing of a co-location tag. In addition or in the alternative, the co-location tag comprises a parameter that is used with connect_data parameter to route co-located database sessions having the co-location tag to a single database instance of the plurality of database instances.

In some embodiments, the one or more co-located database sessions for the at least one database instance of the multiple database instances where each co-located database session of the one or more co-located database sessions are labeled, marked, or tagged with information pertaining to a respective termination method which, when executed, terminates each co-located database session.

In some of the immediately preceding embodiments, the termination method is determined from a plurality of different termination methods that comprises at least one of a graceful kill termination method, a planned failover termination method, a forced failover termination method, or a forcible termination method.

In some embodiments, the termination method for a specific co-location database is determined at least by performing two or more of a first analysis of the at least one database instance to determine whether the graceful termination method applies, a second analysis of the at least one database instance to determine whether the planned failover termination method applies, a third analysis of the at least one database instance to determine whether the forced failover termination method applies, or a fourth analysis of the at least one database instance to determine whether the forcible termination method applies.

Some embodiments are directed at a hardware system that may be invoked to perform any of the methods, processes, or sub-processes disclosed herein. The hardware system may include at least one microprocessor or at least one processor core, which executes one or more threads of execution to perform any of the methods, processes, or sub-processes disclosed herein in a computing system located in a local computing environment in some embodiments or in a cloud environment in some other embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

Further details of aspects, objects, and advantages of the invention are described below in the detailed description, drawings, and claims. Both the foregoing general description and the following detailed description are exemplary and explanatory, and are not intended to be limiting as to the scope of the present disclosure.

BRIEF DESCRIPTION OF THE FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE EMBODIMENTS OF THE PRESENT DISCLOSURE

Figure 1:
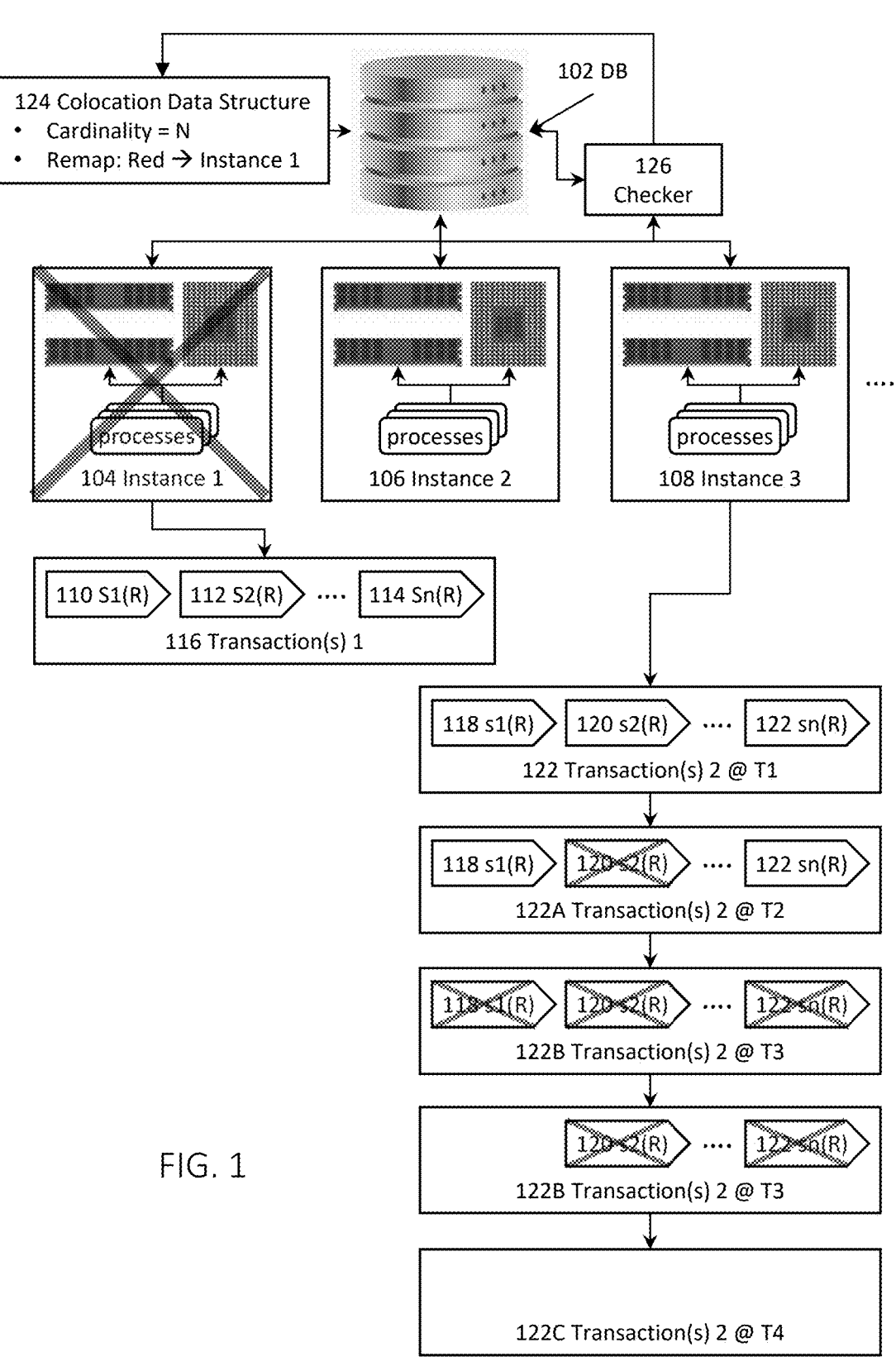
FIG. 1 illustrates a high-level block diagram of some embodiments of the present disclosure.

Embodiments of the present disclosure provide a method, a computer program product, and a computer system for remapping database sessions in the event of a cardinality change.

Various embodiments are now described hereinafter with reference to the drawing figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

FIG. 1 illustrates a high-level block diagram of some embodiments of the present disclosure. In these embodiments, a database 102 (e.g., a clustered database) may store thereupon or has access to a co-location data structure 124 that may further store information such as the current cardinality of the database 102, and/or mapping of co-located sessions into a specific database instance of a plurality of database instances (e.g., 106 database instance 1, 108 database instance 2, 108 database instance, etc.) that may be instantiated from the database 102. In some embodiments, the database 102 comprises a clustered database. A clustered database includes a type of database architecture that uses multiple physical and/or virtual servers or nodes that are connected to a single database while working together to distribute and efficiently process database tasks. It shall be noted that unless otherwise explicitly stated, the terms instance and database instance are used interchangeably in the present disclosure.

A clustered database provides high or higher availability (HA) because in the event of a node, server, or database instance failure, the other nodes, servers, or database instances may continue to perform operations to maintain high or higher availability and minimizing disruptions. A clustered database provides high or higher scalability (HS) because one or more additional nodes, servers, or database instances may be added to the clustered database while these one or more nodes, servers, or database instances may function as one or more single units by synchronizing the one or more additional nodes, servers, or database instances and further by distributing data across these one or more additional nodes, servers, or database instances. In some of these embodiments, data may be distributed and replicated across multiple nodes, servers, or database instances, and each node, server, or database instance function as a single unit and may operate as part of a single database cluster by distributing data across synchronized nodes, servers, and/or instances while ensuring that each node, server, or instance may access the same information.

A cluster database described herein thus provides the advantage of fault tolerance because there is more than one node, server, or database instance for users to connect to, even in the event of individual node, server, or database instance failure. A cluster database described herein may further provide the advantage of load balancing to allow users to be automatically allocated to the node, server, or database instance with the least or less workload.

In some embodiments, a clustered database described herein may include a shared-nothing architecture where each node, server, or database instance is fully independent, so there is no single point of contention. An example of this shared-nothing architecture would be when a company has multiple data centers for a single website. In these embodiments, with many nodes, servers, and/or database instances across the globe, no single server is a master. Shared-nothing may also be referred to as database sharding.

In some other embodiments, a clustered database described herein may include a shared-disk architecture where all data is stored centrally and then accessed via database instances stored on different servers or nodes. In yet other embodiments, a clustered database described herein may have a grid computing or distributed caching architecture where data is still centrally managed but controlled by a powerful "virtual server" that is comprised of many servers that work together as one.

A database instance comprises a set of memory structures that manages database files and may represents a connection between an application and the database that stores its persistent objects in some embodiments. In some embodiments, a database instance comprises a collection of memory and processes that interacts with a database which comprises a set of physical files that actually store data. In some of these embodiments, a database session includes a semi-permanent container of state for an information exchange in a database while a database connection refers to the physical communication channel between a database server and an application and may include, for example, a TCP (transmission control protocol) socket, a named pipe, a shared memory region, etc. A database instance may handle zero or more sessions. In this example illustrated in FIG. 1, database instance 1 (104) handles execution of sessions 110, 112, ..., 114 while database instance 3 (108) handles the execution of sessions 118, 120, ..., 122, etc.

FIG. 1 further illustrates an example of remapping database sessions in response to a cardinality change. More specifically, the illustrated example includes three database instances (104, 106, and 108). As a result, the cardinality of the clustered database is three ("3") to reflect the total number of three database instances in the database cluster in FIG. 1. The cardinality may generally refer to the number of values in a set. In some embodiments in the database realm, the cardinality includes the number of distinction values in a table column relative to the number of rows in the database table where repeated values in the column do not count.

In some embodiments, cardinality includes the total number of database nodes, servers, and/or database instances (collectively referred to as instance for singular reference or instances for plural references) in the database cluster and reflects the group membership for the database. A group membership may include an object that represents a mode group a database administrator may use groups to manage access to database connections and collections for clusters of members with similar needs in some embodiments. In some of these embodiments, a group membership refers to the cardinality of the database instances of the clustered database. The cardinality and the group membership may thus dynamically change when one or more servers, nodes, and/or database instances join (e.g., added to the clustered database) or leave (e.g., become unavailable) the clustered database.

In this example illustrated in FIG. 1, assuming database instance 1 (104) becomes unavailable (e.g., power outage, occurrence of a disaster, or any other errors that cause the database instance 1 (104) to become unavailable). As a result, the cardinality (or group membership) is dynamically updated to two ("2"). In some embodiments where co-location is enabled by designating, assigning, or otherwise associating (e.g., mapping) certain database sessions to or with a particular database instance to avoid cross-instance data transfer, mapping or remapping for co-location may be determined by using a consistent hash function that may have a symbolic form of, for example, Hash(Color)/Mod (cardinality) where Hash denotes a hash function, Color denotes a particular mapping of sessions to a specific database instance, Mod refers to the modular arithmetic operator, and Cardinality refers to the cardinality of database instances in the clustered database. Some other embodiments may use a variable hashing function that is devised to map database sessions to a database instance in the event of a group membership change in a way to avoid excessive or unnecessary moving database session(s), although moving a database session from one database instance to another database instance does not incur much cost.

In this example, database sessions were first mapped to database Instance 1 (104). Once database Instance 1 (104) becomes unavailable, the cardinality changes from three to two. In some of these embodiments, the database sessions 110, 112, and 114 for transaction 1 (116) may go down with database Instance 1 (104). As a result, mapping of database instances using a consistent hashing function now maps database sessions to, for example, database Instance 3 (108). FIG. 1 illustrates that after remapping database sessions to database Instance 3 (108), database sessions 118, 120, and 122 are mapped to database Instance 3 for transaction 2 at the timepoint T1 (122). Database Instance 3 may continue to receive new database session(s) so long as database sessions for the clustered database are mapped to database Instance 3.

At timepoint T2, assuming database instance 1 (104) becomes available again so that the cardinality changes from two to three. In some embodiments where a consistent hashing function is used to determine mapping of database sessions to a specific database instance, new database sessions will now be mapped to database Instance 1 (104) again because the cardinality changes back to three. To avoid cross-instance data transfer, the database sessions in database Instance 3 may have to be terminated once new database session(s) with the same co-location is (are) assigned to database Instance 1 (104).

The database sessions in database Instance 3 (108) may be terminated in one or more ways which will be described in greater details below. In this example at 122A, database session s2(R) (120) may be selected or marked for termination at timepoint T2 (122A); and database sessions s1(R) (118) and sn(R) (122) may further be selected or marked for termination at timepoint T3 (122B). It shall be noted that the tag or label (R) or (Red) denotes that database sessions with the same tag or label are to be co-located in the same database instance to avoid cross-instance data transfer.

At timepoint T3, database session 118 is terminated (e.g., after completing its transaction(s)/operation(s), planned or forced failover, forcibly terminated, etc.) and is thus not shown in 122B. At timepoint T4, all database sessions are terminated and are thus no longer shown in 122C. Once all the database sessions assigned to database Instance 3 (108) are terminated, there will be no further cross-instance data transfer for the database sessions that are supposed to execute in one single database instance.

Figure 2A:
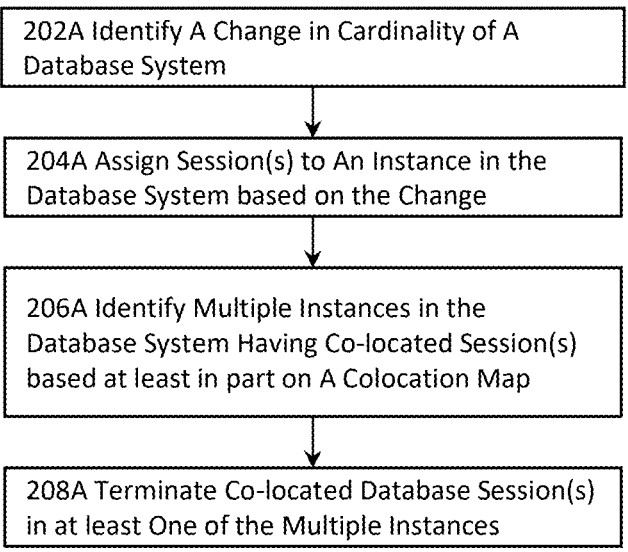
FIG. 2A illustrates a high-level block diagram of an approach to implement some embodiments for remapping database sessions in the event of a cardinality change.

FIG. 2A illustrates a high-level block diagram of an approach to implement some embodiments for remapping database sessions in the event of a cardinality change. In these embodiments, a change in cardinality of a database system may be identified at 202A. In these embodiments, the cardinality may include or refer to the instance cardinality (e.g., the total number of database instances) in the database.

Database sessions to be co-located may be assigned to a specific database instance in the database system at 204A based at least in part upon the change in cardinality. In some embodiments, the specific database instance to which co-located database sessions are assigned may be determined by using a hashing function with the cardinality as an argument and a co-location tag as another argument for the hashing function. More details about assigning database sessions to a specific database instance will be described below. A co-location tag (e.g., COLOCATION_TAG) may comprise a parameter that further comprises an alphanumeric string that the system may use with, for example, the CONNECT_DATA parameter of a Transparent Network Substrate (TNS) connect string. When the COLOCATION-_TAG parameter is set, it attempts to route clients with the same COLOCATION_TAG to the same database instance.

In some embodiments, the connect specification for the database clients may be augmented or replaced with a new key-value pair to enable the techniques for remapping database sessions described herein. For example, the connect specification may include a connect string as follows:

```
Inst1_coloc =
(DESCRIPTION=
ADDRESS=(PROTOCOL=tcp)(HOST=sales1-svr)(Port=1521))
(CONNECT_DATA=
(SERVICE_NAME= .... //*name of service*//
(COLOCATION_TAG=red)))
```

In some embodiments, the connect specification may be modified to include the following connect string:

```
REMAP_TAG=DISCONNECT //*the addition of this string enables the remapping
features described herein*//
Inst1_coloc = )DESCRIPTION=
(ADDRESS=(PROTOCOL=tcp)(HOST=sales1-svr)(PORT=1521))
(CONNECT_DATA=
(SERVICE_NAME= .... //*name of service*//
(COLOCATION_TAG=red)(REMAP_TAG=DISCONNECT))
```

A connect specification or connection specification may include, for example, an Extensible Markup Language (XML) that describes, for example, how operators in connect to and access a database system or a portion thereof (e.g., messaging systems) in some embodiments. A connection specification may include a collection of connection-_specification elements and/or access_specification elements (e.g., in the form of strings) in some of these embodiments. A connect specification may be used to, for example but not limited to, connect to a database manager, define a new database connection specification, update a database connection specification, or delete a database connection specification.

A CONNECT_DATA parameter, on the other hand, may be used to define the connection service. In some embodiments, a CONNECT_DATA parameter may also define a service (e.g., with the SERVICE_NAME parameter) to which a connection is desired. In some embodiments, a CONNECT_DATA parameter may be placed under the DESCRIPTION parameter and permits additional parameters as listed in the Connection Data Section of the connect specification. A co-location tag may also be used with the CONNECT_DATA parameter Multiple database instances each having one or more co-located database sessions in the database system may be identified at 206A based at least in part upon a co-location map in some embodiments. For example, database sessions that are desired or required to be assigned to a single database instance yet are spread across multiple database instances may be identified at 206A. in these embodiments, database sessions that are required or desired to be assigned to a single database instance may be referred to as co-located database instances.

In some of these embodiments, a co-located database session may be identified or associated with a co-location tag. In some embodiments, a co-located database session may be identified or associated with a service or a unique identifier of the service (e.g., the name of the service). In some embodiments, a co-located database session may be identified or associated with a co-location tag and the service (or a unique identifier of the service). In some embodiments, a co-location map includes a data structure that stores thereupon a tuple such as <instance, co-location_tag_hash>. In some embodiments, a co-location map includes a data structure that stores thereupon a triple such as <service-_name, instance, co-location_tag_hash>. In some of these embodiments, a co-location map may also store the cardinality of the database.

In some embodiments, identifying such multiple database instances at 206A may be performed by a background process of the database. For example, a background process may constantly check the availability of database instances in the database and/or check the co-location map or other sources of information at a fixed or variable time interval or in a temporarily continuous manner to determine whether more than one database instance has been assigned one or more database sessions that are desired to be co-located. In some embodiments, the background process may first check or be informed of a change in the cardinality or the group membership of the database, and if so, check whether multiple database instances have been respectively assigned one or more database sessions that are desired to be co-located.

Co-located database session(s) in at least one database instance of the multiple database instances may be terminated at 208A. In some embodiments, any database sessions assigned to a database session that is not currently designed for co-located database sessions will be designated and eventually terminated at 208A while new database sessions are/will be mapped to the currently designed database instance for co-located database sessions. More details about terminating database sessions will be described below with reference to FIGS. 2B, 3, and 5.

Figure 2B:
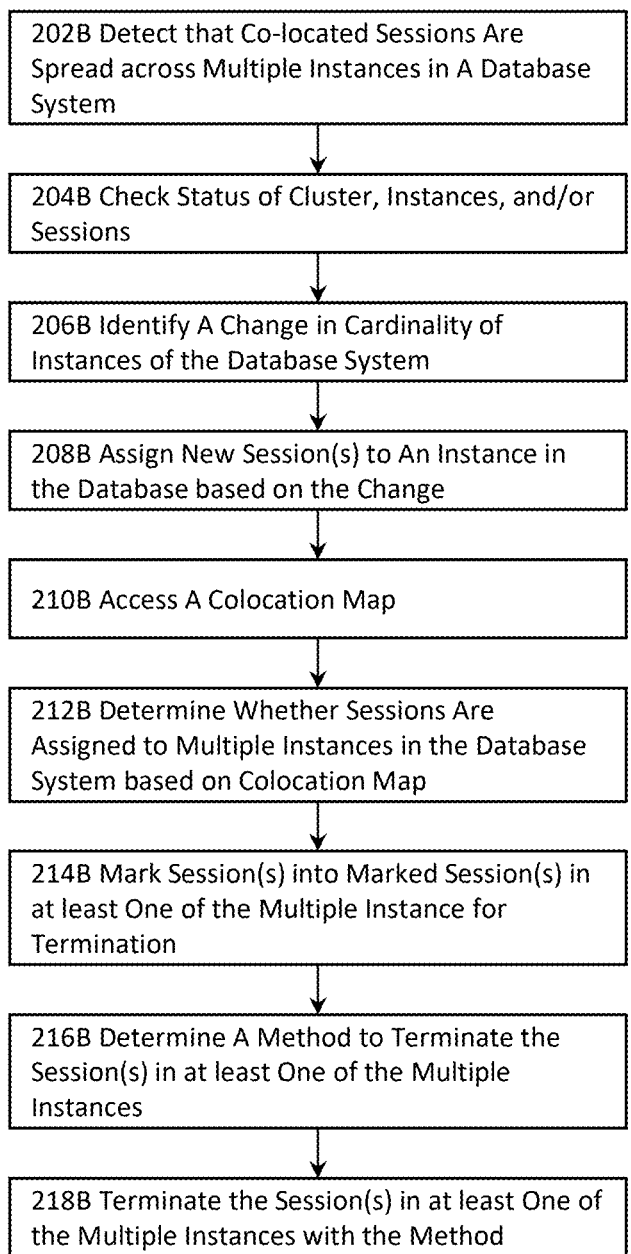
FIG. 2B illustrates a more detailed block diagram of an approach to implement some embodiments for remapping database sessions in the event of a cardinality change.

FIG. 2B illustrates a more detailed block diagram of an approach to implement some embodiments for remapping database sessions in the event of a cardinality change. In these embodiments, database sessions that are desired to be co-located tin a single database instance may be detected at 202B in a database system by a background process may constantly check the availability of database instances in the database system and/or check the co-location map or other sources of information at a fixed or variable time interval or in a temporarily continuous manner to determine whether more than one database instance has been assigned one or more database sessions that are desired to be co-located.

At 204B, the status of the clustered database, the respective status of the database instances, and/or the respective status of database session(s) assigned to each of the database instances may be checked. For example, a connection status to a database instance may be checked at 204B to determine its, for example, viability, speed, and/or performance, etc. At 206B, a change in cardinality of the database system may be identified. In these embodiments, the cardinality of the database system refers to the total number of active, available database instances in the database system.

New database sessions may be assigned to a specific database instance based at least in part upon the change in cardinality at 208B. In some embodiments, the specific database instance may be determined randomly, based on load balancing, or based on the result of a hashing function that accepts, for example, the co-location label or tag for particular transaction(s) distributed among a plurality of database sessions, based on a variable hashing function that maps new database sessions to a database instance in the event of cardinality change in such a way to avoid excessive or unnecessary moving database session(s), although moving a database session from one instance to another instance does not incur much cost.

At 210B, a co-location map may be accessed at 210B. As described herein, a co-location map may include a data structure that stores thereupon a tuple of <instance, co-location_tag_hash> some embodiments. In some other embodiments, a co-location map includes a data structure that stores thereupon a triple of <service_name, instance, co-location_tag_hash>. In some of these embodiments, a co-location map may also store the cardinality of the database system.

At 212B, a determination may be made to decide whether database sessions that are required or desired to be co-located in one single database instance are spread across multiple database instances in the database system. In some of these embodiments, the determination may be made based at least in part upon the co-location map accessed at 210B. For example, a background process may constantly check the availability of database instances in the database system and/or check the co-location map or other sources of information at a fixed or variable time interval or in a temporarily continuous manner to determine whether more than one database instance has been assigned one or more database sessions that are desired to be co-located. In some embodiments, the background process may first check or be informed of a change in the cardinality or the group membership of the database system, and if so, check whether multiple database instances have been respectively assigned one or more database sessions that are desired to be co-located.

At 214B, one or more database sessions at a specific database instance may be selected and/or marked for termination. For example, all database sessions in the specific instance may be eventually marked or labeled for termination although these database sessions may be marked or labeled all at once in some embodiments or in more than one batch in some other embodiments. In some embodiments, marking or labeling database sessions for termination may depend on a specific method to terminate these database sessions. More details about marking or labeling database sessions for termination will be described below with reference to FIGS. 3 and 5.

At 216B, a method for terminating the session(s) in the at least one of the multiple database instances may be determined. In some embodiments where the at least one of the multiple database instances includes multiple database sessions, these multiple database sessions may be terminated by using a single termination method while in some other embodiments, these multiple database sessions may be terminated by using multiple, different termination methods. More details about terminating database sessions will be described below with reference to FIGS. 3 and 5.

At 218B, the database session(s) in the at least one of the multiple database instances may be terminated. Once all of the database session(s) is (are) terminated in the at least one of the multiple database instances, cross-instance transfer of data and/or application flows may be reduced or even eliminated when only one database instance now accepts database sessions that are required or desired to be co-located.

Figure 3:
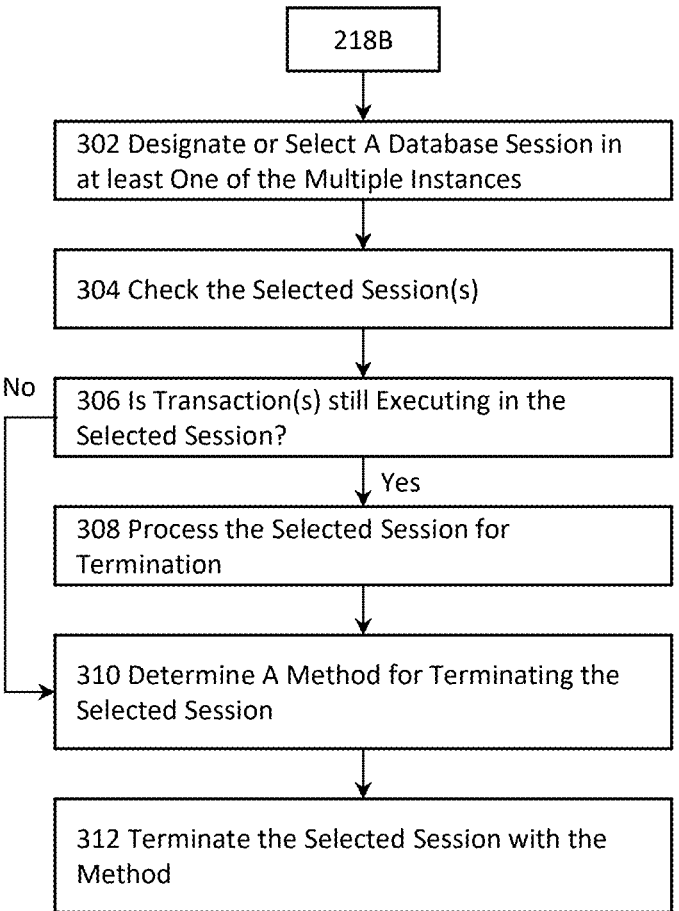
FIG. 3 shows a more detailed figure of a portion of FIG. 2B in some embodiments of the present disclosure.

FIG. 3 shows a more detailed figure of a portion of FIG. 2B in some embodiments of the present disclosure. More specifically, FIG. 3 illustrates more details about terminating database sessions. In these embodiments, a database session in the at least one of the multiple database instances may be designated or selected at 302. Although all database sessions in a database instance are to be eventually terminated to reduce or avoid cross-instance transfer, not all database sessions need to be designated or selected for termination all at once. Rather, these database sessions may be individually designated or selected in some embodiments or in more than one batch in some other embodiments.

The database session designated or selected at 302 may be checked at 304. For example, the database session may be checked to determine whether it may be drained, whether it may be subject to a planned failover, whether it may be subject to a forced failover, whether a kill (e.g., a forcible termination or kill) is the only termination method available at 302.

A determination may be made at 306 to decide whether one or more transactions or operations therefor are still executing in the selected database session. In some embodiments, a transaction comprises a unit of work submitted as a whole to a database for processing. A database session may include one or more transactions. When multiple user of an application program is interacting with the database at one time, these transactions for the multiple users are deemed running concurrently.

Concurrent transactions may run in one of two ways: concurrently transactions may run serially, in which case one transaction completes its work before the second begins in some embodiments; or transactions may run interleaved, in which case the actions of both transactions alternate in some other embodiments. In the latter embodiments, the results of interleaved transaction execution should be the same as that of serial execution (regardless of which transaction went first). If interleaved transaction execution produces such a result, the transactions are deemed serializable.

The selected database session may be processed at 308. For example, the selected database session may be processed to determine whether a transaction completion semantic has already been issued in some embodiments. In some other embodiments, the selected database session may be processed to tag, label, or otherwise associate the selected database session with a transaction kill semantic which, when executed, gracefully terminates the selected database session upon or after the completion of execution of transaction(s) in the selected database session.

Yet in other embodiments, the selected database session may be processed to tag, label, or otherwise associate the selected database session with a planned failover which, when executed, moves the selected database session to a different database session (e.g., to the database session that is currently designated as receiving database sessions that are desired or required to be co-located in a single database instance) at a planned or desired time or when one or more conditions are satisfied.

Yet in other embodiments, the selected database session may be processed to tag, label, or otherwise associate the selected database session with a forced failover which, when executed, moves the selected database session to a different database session (e.g., to the database session that is currently designated as receiving database sessions that are desired or required to be co-located in a single database instance). Yet in some other embodiments, the selected database session may be processed to tag, label, or otherwise associate the selected database session with a forcible kill semantic which, when executed, forcibly terminates the selected database session.

At 310, a method for terminating the selected database session may be determined at 310. More details about methods for terminating a database session will be described below with reference to FIG. 5. Once the method for terminating the selected database session is determined at 310, the selected database session may be terminated at 312 by executing the determined method for termination.

FIGS. 4A-4G illustrate some examples of applying some techniques described herein to implement some embodiments of the present disclosure. In these embodiments, the example clustered database at time T1 includes a database 402A. In some of these embodiments, the database may store therein or have access to a data structure 404A that may further store information such as the cardinality of the database 402A, the mapping of database sessions to a specific database instance, etc. for a co-location map. In the example illustrated in FIG. 4A, the database 402A includes three database instances—database Instance 1 (406A), database Instance 3 (408A), and database Instance 3 (408A)—and hence the cardinality of the database instances of the database 402A is currently three ("3") at time T1 (400A).

Figure 4A:
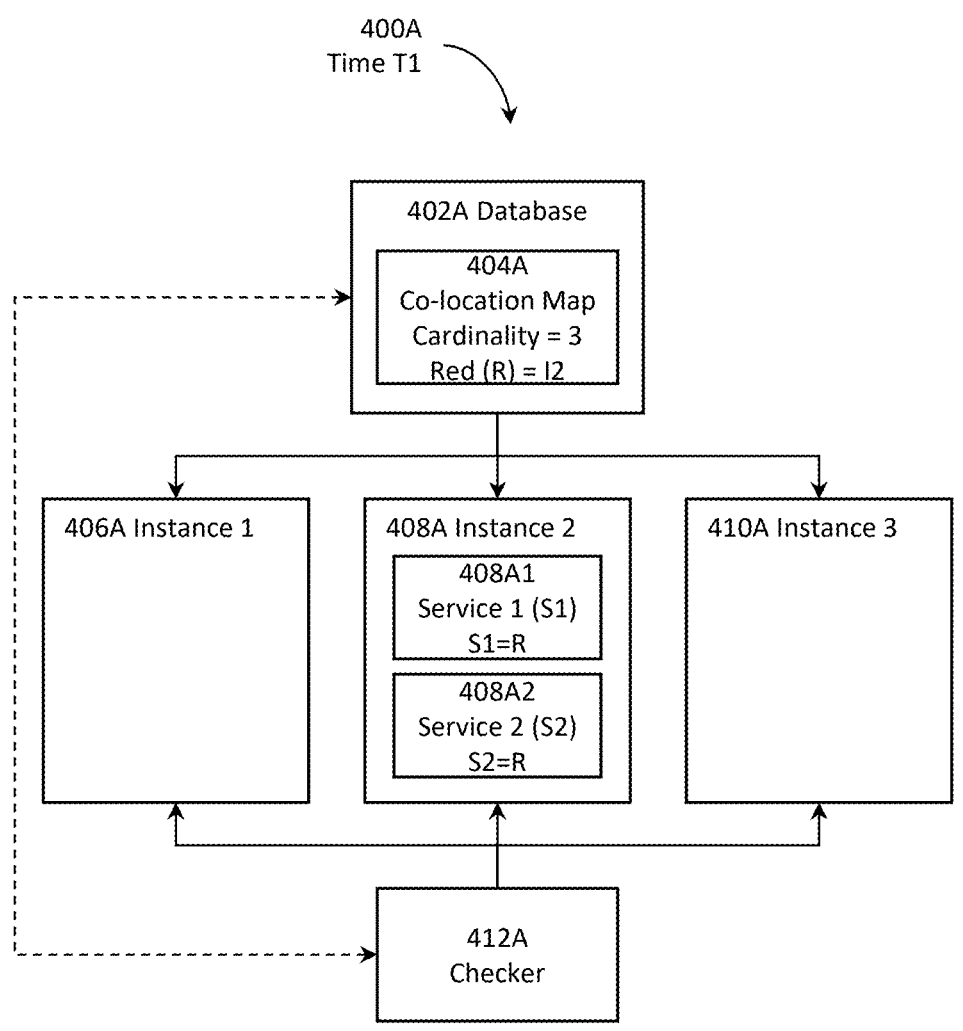
FIGS. 4A-4G illustrate some examples of applying some techniques described herein to implement some embodiments of the present disclosure.

The example in FIG. 4A further illustrates the mapping or remapping of co-located database sessions to database Instance 2 (408A). In some of these embodiments, mapping or remapping database sessions to a specific database instance for co-location may be determined by using a consistent hash function that may have a symbolic form of, for example, Hash(Color)/Mod(cardinality) where Hash denotes a hash function, Color denotes a particular mapping of sessions to a specific database instance, Mod refers to the modular arithmetic operator, and Cardinality refers to the cardinality of database instances in the clustered database. Some other embodiments may use a variable hashing function that is devised to map database sessions to a database instance in the event of a group membership change in a way to avoid excessive or unnecessary moving database session(s), although moving a database session from one database instance to another database instance does not incur much cost.

With database instance 2 (408) currently designated as the database instance for co-located database sessions, session 1 (S1) 408A1 and session 2 (S2) 408A2 are assigned or mapped to database instance 2 (408A) for execution.

The clustered database architecture may optionally include a background process which is referred to as a checker or a checker process 412A and constantly check the availability of database instances in the database and/or check the co-location map or other sources of information at a fixed or variable time interval or in a temporarily continuous manner to determine whether more than one database instance has been assigned one or more database sessions that are desired to be co-located. In some embodiments, the background process may first check or be informed of a change in the cardinality or the group membership of the database, and if so, check whether multiple database instances have been respectively assigned one or more database sessions that are desired to be co-located.

In some embodiments, the aforementioned co-location map may be distributed in the clustered database (e.g., in two or more database instances in the clustered database) and may be used to send new connections with the same service and co-location tag to a database instance.

In some embodiments, this checker 412 may be part of the database or remotely accessible by the database 402A as a central authority that checks against all of the database instances in the clustered database. In some other embodiments, the checker 412A may be distributed across the multiple database instances (e.g., each database instance corresponds to one checker instance) so that each database instance is monitored or checked by its corresponding checker instance.

Figure 4B:
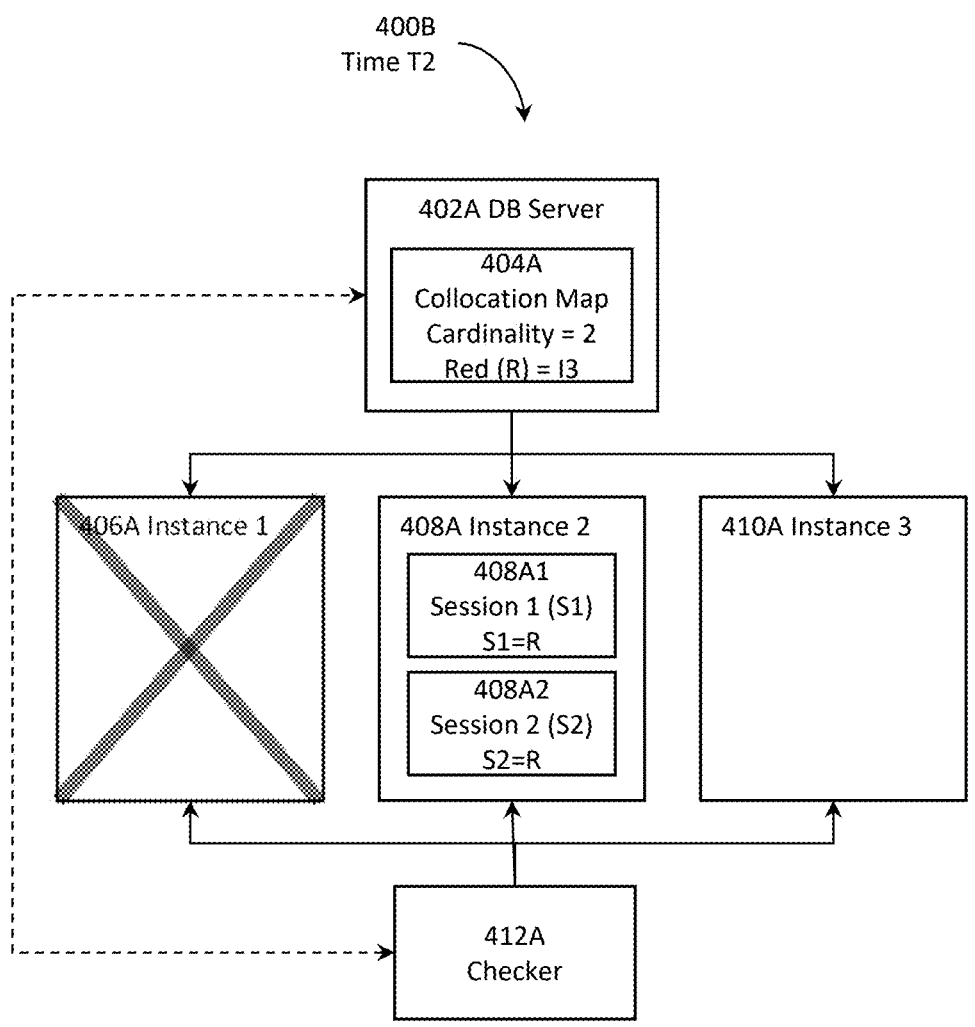

FIG. 4B illustrates the clustered database at time T2 (400B). As time has progressed, one or more database instances may become unavailable (e.g., power outage, occurrence of a disaster, or any other errors that cause the database instance 1 (104) to become unavailable). Also, one or more additional database instances may be added to the clustered database for scalability, for instance. Further, a database session that had become unavailable may again become available. Any changes in the cardinality of the total number of database instances may change the mapping of co-located database sessions to a different database instance.

In this example illustrated in FIG. 4B, database instance 1 (406A) becomes unavailable. As a result, the cardinality changes from three to two. In some embodiments where co-location remapping is determined by using a consistent hashing function described above, the change in cardinality leads to remapping new database sessions to a different database instance because the consistent hashing function accepts the co-location tag and the cardinality as inputs to determine the hashed output that corresponds to a particular database instance, and further because the same hashing function now with a different cardinality number outputs a different output. In this example in FIG. 4B, new database sessions with the same co-location tag (e.g., database instances with same tag or label indicate assignment to the same database instance) are now to be mapped or assigned to database instance 3 (410A) with the cardinality of two, rather than to database instance 1 (408A) with the cardinality of three.

Figure 4C:
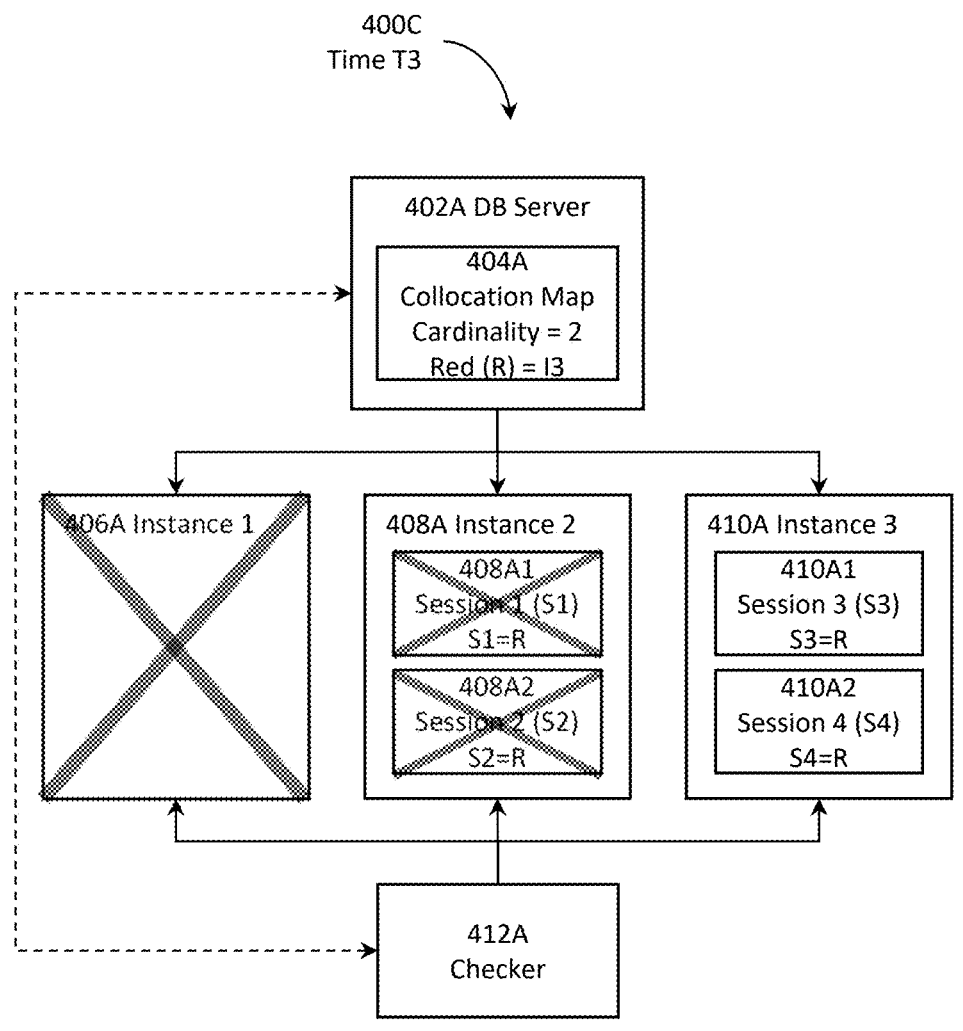

FIG. 4C illustrates the same database architecture at time T3 (4000) where, given the current remapping of database sessions to database instance 3 (410A), database session 3 (S3) 410A1 and database session 4 (S4) 410A2 have been assigned to database instance 3 (410A). As a result of this remapping, the checker 412A may detect that co-located database sessions are now spread across multiple database instances. For example, both database instance 2 (408A) and database instance 3 (410A) now contain database sessions that are desired or required to be co-located in one single database instance.

A database instance may then be determined as a victim database instance from these multiple database sessions (e.g., 408A and 410A in this example) for terminating the database sessions thereon. In some embodiments, the database instance with the oldest or older database session(s) may be determined. For example, the respective creation timestamps of the database sessions in these multiple database instances may be compared to identify the oldest database session (e.g., the database session with the earliest creation timestamp). In this example illustrated in FIG. 4C, database instance 2 (408A) may be determined for terminating the database sessions thereon, assuming either session 1 408A1 or session 2 408A2 has the oldest creation timestamp.

In some embodiments, rather than determining one or more database instances for terminating their database sessions, a database session having the latest database session creation timestamp may be identified while the remaining database instances having one or more co-located database sessions may be determined for termination of their respective database sessions. In some other embodiments, database instance(s) of the multiple database instances that is not the currently designated database instance for co-located database sessions may be determined for termination its (their) database sessions. In other embodiments, a database instance have a fewest or fewer number of database sessions may be determined for termination of its database session(s). Yet in some other embodiments, a database instance having the most or a greater number of database sessions may be identified, while the remaining one or more database instances may be determined for termination of their respective database session(s).

In this example illustrated in FIG. 4C, database instance 2 (408A) is identified for terminating its database sessions 408A1 and 408A2 which are then labeled, tagged, or otherwise identified as such for termination. Multiple database sessions (e.g., 408A1 and 408A2) may be terminated by using the same termination method in some embodiments or by two or more different termination methods in some other embodiments.

Figure 4D:
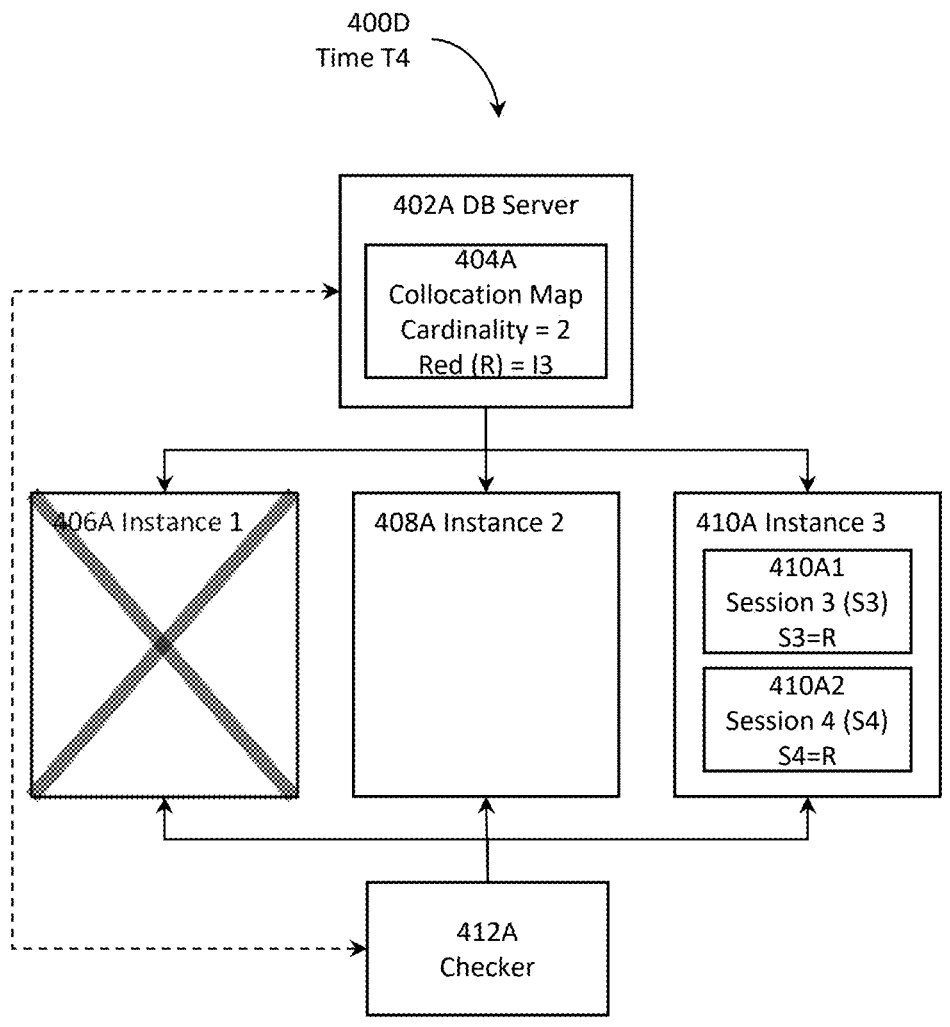

FIG. 4D illustrates the same database architecture at time T4 (400D) where, given the current remapping of database sessions to database 3 (410A) and the spread of co-located database sessions in multiple database instances illustrated in FIG. 4C, the database sessions 408A1 and 408A2, which have been marked for termination in FIG. 4C described above, are now terminated, which database instance 1 remains unavailable (hence the cardinality remains at two). As a result, cross-instance transfer of data and/or application flows is not reduced or completely eliminated because all of the co-located database sessions are now executing in a single database instance 410A.

Figure 4E:
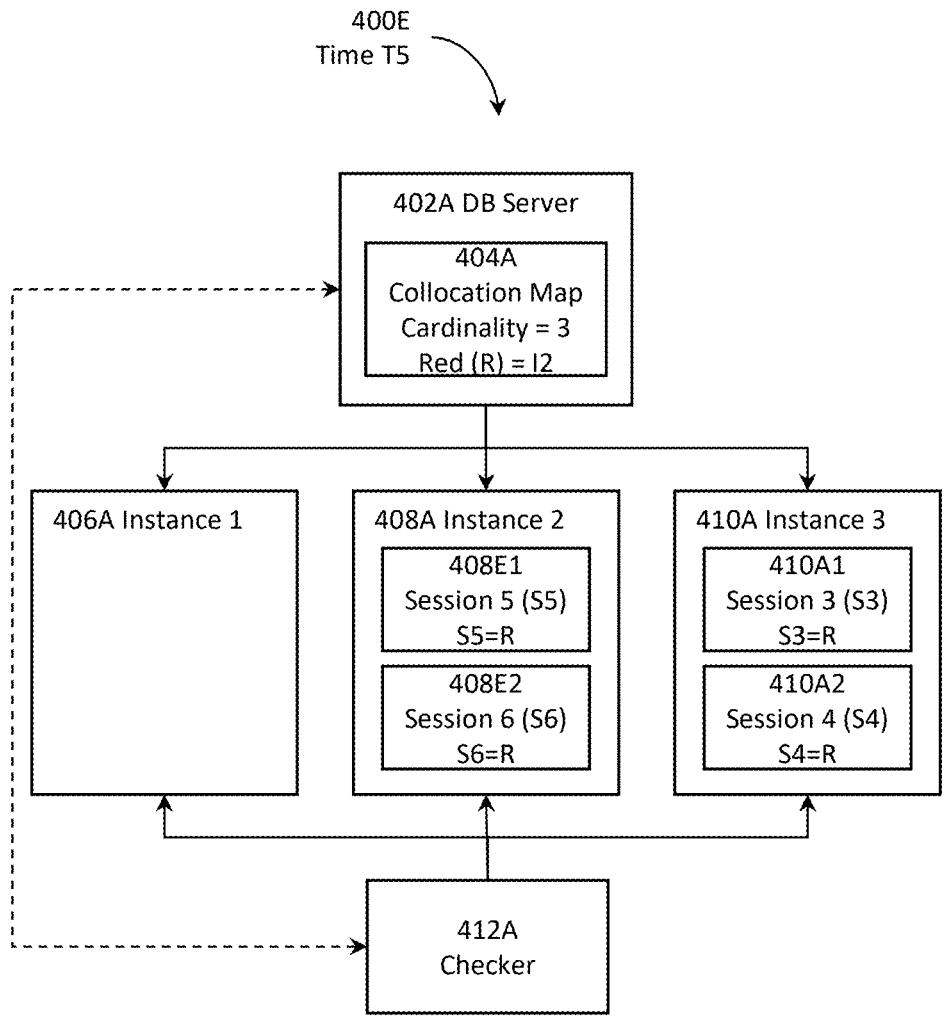

FIG. 4E illustrates the same database architecture at time T5 (400E) where database instance 1 (406A), after becoming unavailable for some time as illustrated in FIGS. 4A-4D, comes back up and rejoins the clustered database. As a result, the cardinality changes from two to three. In some embodiments where co-location remapping is determined by using the aforementioned consistent hashing function, the change in cardinality from two back to three leads to remapping new, co-located database sessions back to database instance 2 (408A) as that illustrated in FIG. 4A.

Once new, co-located database sessions are remapped to database instance 2 (408A), new, co-located database session 5 (S5) 408E1 and database session 6 (S6) 408E2 are then assigned to database instance 2 (408A) as illustrated in FIG. 4E. Again, the checker 412A may constantly check the availability of database instances in the database and/or check the co-location map or other sources of information at a fixed or variable time interval or in a temporarily continuous manner. In this example illustrated in FIG. 4E, the checker 412A may determine that both database instances 408A and 410A have database sessions that are desired to be co-located yet are spread across two different database instances.

Figure 4F:
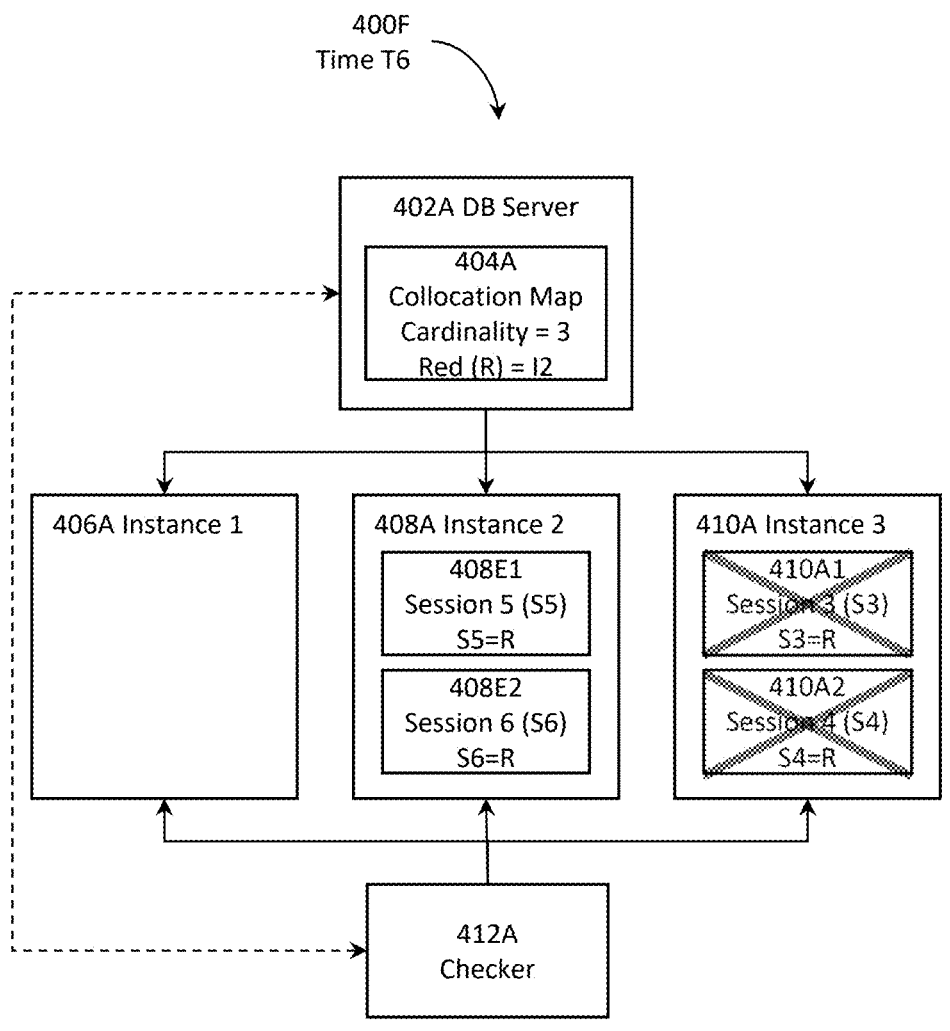

FIG. 4F illustrates the same database architecture at time T6 (400F) where database instance 1 (406A), after becoming unavailable for some time as illustrated in FIGS. 4A-4D, comes back up and rejoins the clustered database as illustrated in FIG. 4E. As described above, the checker 412A may determine that both database instances 408A and 410A have database sessions that are desired to be co-located yet are spread across two different database instances.

As described above, a victim database may be determined from the multiple database instances that have one or more database sessions that are desired or required to be co-located to a single database instance. In some embodiments where the database instance having the oldest or older database session(s) may be determined. For example, the respective creation timestamps of the database sessions in these multiple database instances may be compared to identify the oldest or older database session(s).

In this example illustrated in FIG. 4F, the database sessions 410A1 and 410A2 have older creation timestamps than the database sessions 408E1 and 408E2 because the latter database sessions were assigned to database instance 2 (408A) after database instance 1 (408A) rejoins the clustered database while database sessions 410A1 and 410A2 were assigned to database instance 3 (410A) while database instance remained unavailable. As a result, database instance 3 (410A) may be identified as the victim instance whose database sessions are then subject to termination to reduce or avoid cross-instance of transfer of data or application flows.

As described above, database instances 410A1 and 410A2 may be individually marked, labeled, or tagged for termination in some embodiments or may be marked, labeled, or tagged for termination all at once in some other embodiments. In some embodiments, each of database instances 410A1 and 410A2 may be terminated with a different termination method while in some other embodiments, all of the database instances labeled may be terminated using the same termination method.

Figure 4G:
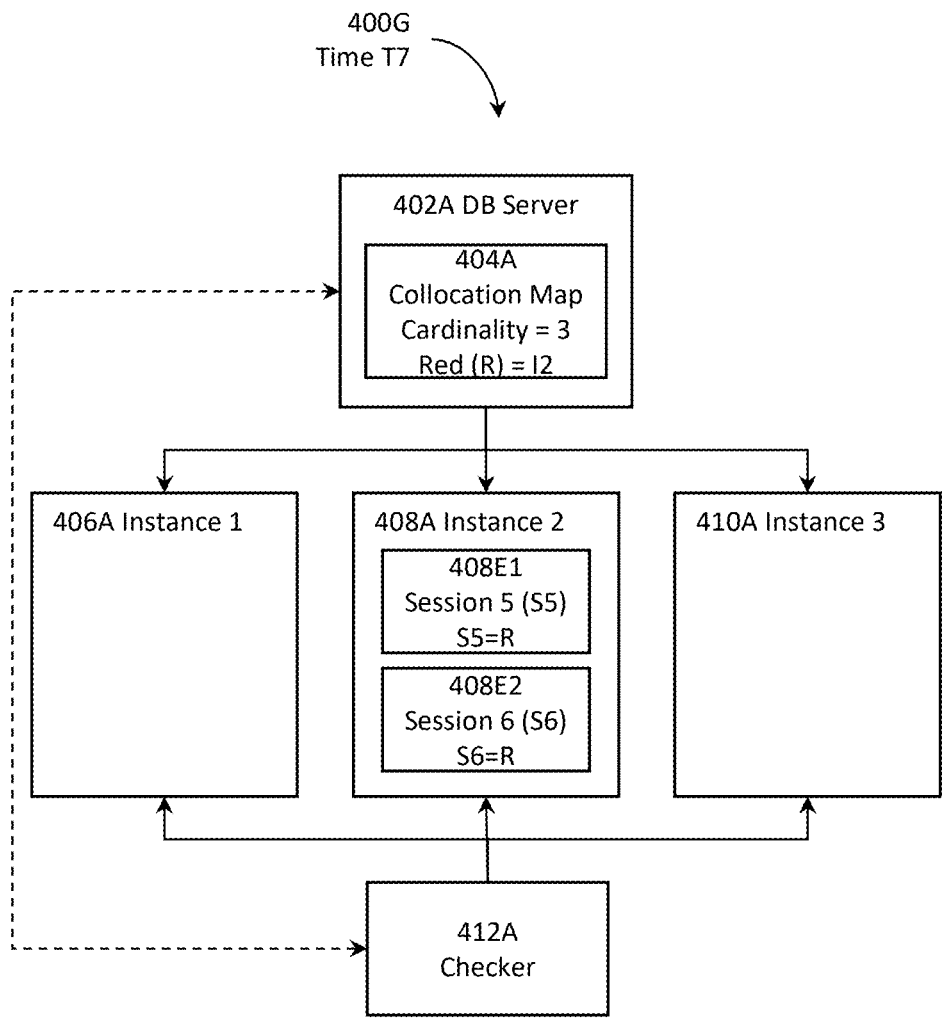

FIG. 4G illustrates the same database architecture at time T7 (400G) where database sessions 410A1 and 410A2 in database instance 3 (410A) have been terminated while the co-location remapping continues to assign co-located database sessions to database instance 2 (408A) that is now the only database instance executing co-located database sessions. As a result, cross-instance transfer of data and/or application flows may be avoided.

It shall be noted that although various examples provided in the present disclosure describe assigning co-located database sessions to a single database instance, these examples shall not be interpreted as so limiting the scope of the present disclosure. In some embodiments, the same techniques described herein may be applied to assign respective sets of co-located database sessions to corresponding database sessions. For example, these techniques described herein may assign a first set of co-located database sessions with a first co-location tag (e.g., "Red" or "R" as illustrated in FIGS. 4A-4G), a second set of co-located database sessions with a second co-location tag (e.g., "Blue" or "B"), etc. Further, the example colors described herein for the co-location tags are mere examples, and that a set of co-located database sessions that is desired or required to be assigned to a single database instance may also be identified, labeled, or marked with other data types of co-location tag such as a string, a value, etc.

Figure 5A:
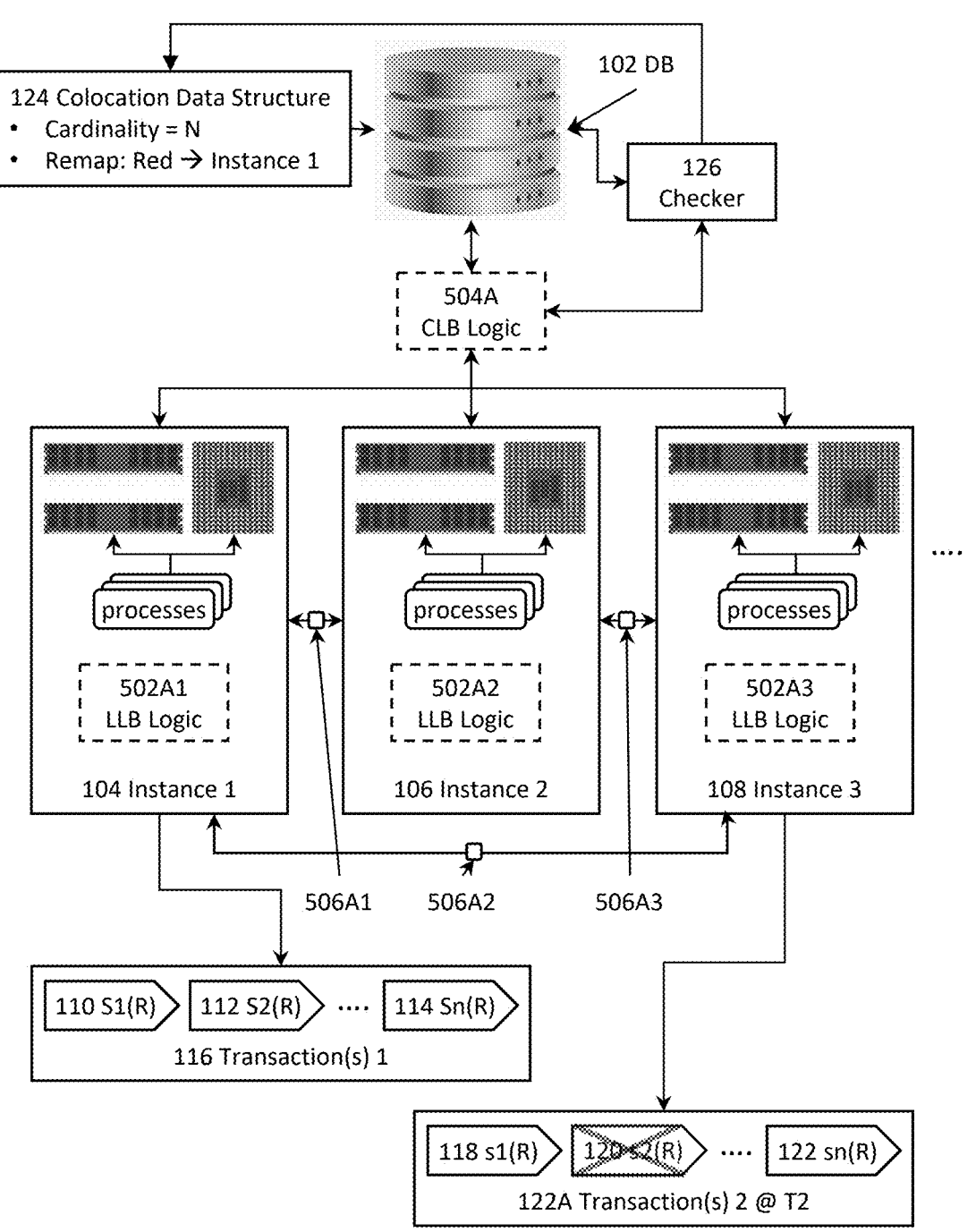
FIG. 5A illustrates a simplified architecture of some embodiments of the present disclosure.

FIG. 5A illustrates a simplified database architecture of some embodiments of the present disclosure. In these embodiments, the database architecture may be distinguishable from that illustrated in FIG. 1 in that the simplified database architecture in FIG. 5A may further optionally include either distributed local load-balancing orchestration logic or a central load balancing orchestration logic 504A. A load balancing orchestration logic, whether central or local, receives global data (e.g., data pertaining to workloads, performance, connection status, etc.) on an ongoing basis that provide each database instance and/or the database the ability to understand a global view of workloads across all the database instances in the clustered database. One of the purposes of having a load balancing orchestration logic is that some embodiments may account for load balancing in the identification of one or more victim database instances to avoid cross-instance transfer of data or application flows. In some embodiments, a load balancing orchestration logic may also be used in the determination of a termination method.

In some embodiments where the simplified database architecture comprises distributed local load balancing orchestration logic 504A, each database instance (e.g., 104, 106, 108, etc.) may include a respective local load balancing orchestration logic. For example, database instance 1 (104) may include a first local load balancing orchestration logic 502A1, database instance 2 (106) may include a second local load balancing orchestration logic 502A2, and database instance 3 (108) may include a third local load balancing orchestration logic 502A3.

A local load balancing orchestration logic may receive data 506A (e.g., global data) on an ongoing basis from other database nodes, servers, or database instances. For example, database instance 1 (104) may receive data 506A1 from database instance 2 (106) and data 506A2 from database instance 3 (108); database instance 2 (106) may receive data 506A1 from database instance 1 (104) and data 506A3 from database instance 3 (108); and database instance 3 (108) may receive data 506A3 from database instance 2 (106) and data 506A2 from database instance 1 (104).

In some other embodiments where the simplified database architecture includes a central load balancing orchestration logic 504A, the central load balancing orchestration logic 504A may receive global data from all the database instances in the clustered database in a substantially similar manner as that described above for distributed load balancing orchestration logic 502A1, 502A2, 502A3, etc. A database instance or the database server may use the data from the load balancing orchestration logic to analyze the global data to determine whether a load imbalance exists based at least in part upon a local skew value for each database instance. When it is determined that a load imbalance exists, a database instance and one or more database sessions therein may be identified for load balancing.

In some embodiments where a victim database instance is determined, these techniques may be used to determine and label one or more database sessions for earlier termination, despite the fact that the objective is to terminate all the database sessions in the victim database instance to avoid cross-instance transfer of data and/or application flows. In some of these embodiments, these techniques described herein with reference to FIG. 5A may be used to determine one or more database sessions that may be drained. In some embodiments, a database session that has been high availability-enabled may be identified as drainable, which may be terminated with the least aggressive termination method.

Each of the one or more database sessions that are marked as drainable may be given an opportunity to be drained as a graceful and less-expensive way to remove the database session's workload from the victim database instance. For example, a database session marked as drainable may be given an opportunity to complete its execution of transaction(s) and once the transaction(s) is (are) completed, the database session may be terminated gracefully (e.g., with the transaction kill semantic) in some embodiments.

As another example, the drain approach may be applied to a specific database session, where the specific database session will implement a stop service functionality and/or relocate service functionality, e.g., where a "service unavailable" response is provided to any requests for service from a client. In some of these embodiments, draining automatically includes planned failover for database sessions that are unlikely to drain, but are likely to failover. This process is repeated for each session to allow time for the session to drain.

New workloads would be redirected by a central or distributed listener process, which may also maintain a copy of a co-location map, for the database to a database session on an alternative database instance. In the latter approach, the forced and the planned failover methods are more aggressive or invasive than the aforementioned transaction kill method. Once the session has been drained, the idle database session may then be released.

In some embodiments while assuming that the drain and planned failover methods do not invoke for a database session, where the database session was also marked for removal. For any number of reasons, the database session may be in a state that does not lend itself to stop work by itself, e.g., because the session is in the midst of certain database workload activity and is thus unable to stop handling work, services, and/or requests on behalf of a client. In this situation, after waiting for a designated time period, the system may choose to kill the session. In this forced failover approach, database session may be forcibly terminated at the database instance, and its state is transferred to another database instance to be brought up to continue its processing.

In some embodiments, a database session in an identified database instance may be forcibly terminated where forcible termination is more aggressive or invasive than the forced and planned failover termination methods. In some embodiments, each of the database sessions in an identified victim database instance may be analyzed to first determine whether the database session is drainable, then determine whether the planned failover may be applied to the database session, then determine whether forced failover may be applied to the database session, and if none of the above termination methods apply to the database session, the database session may be forcibly terminated. In some other embodiments, the cost of having cross-instance transfer of data and/or application flows may be compared against that of transaction killing a database session (for graceful kill), the cost of planned failover, the cost of forced failover, and/or the cost of forcible termination, and the termination method with the lowest cost may be selected for one or more database sessions in an identified victim database instance.

Figure 5B:
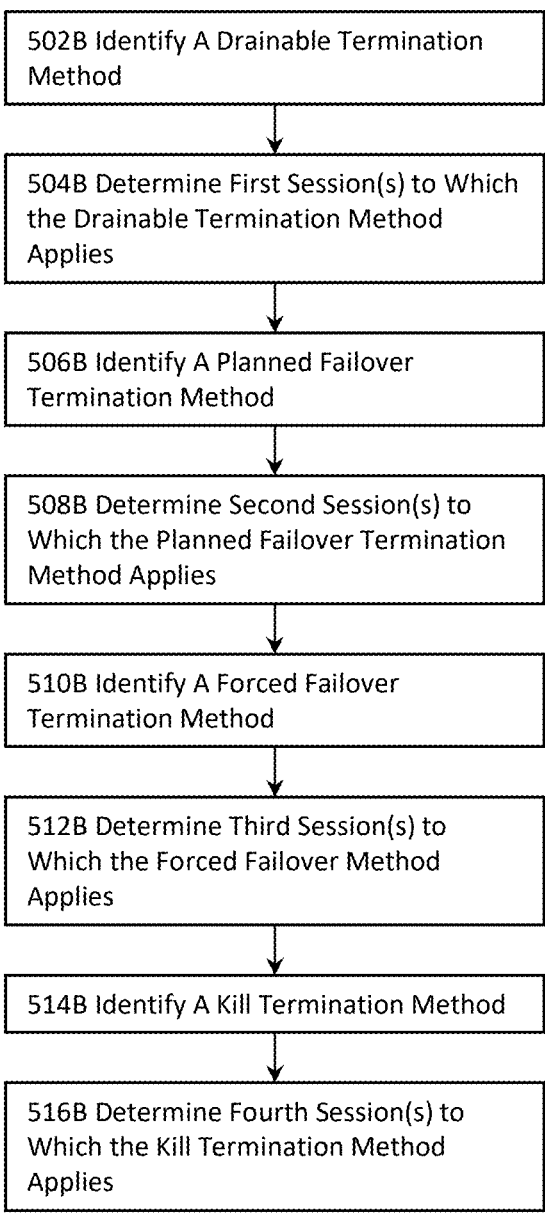
FIG. 5B a high-level block diagram of an approach to implement some embodiments for remapping database sessions in the event of a cardinality change.

FIG. 5B a high-level block diagram of an approach to implement some embodiments for remapping database sessions in the event of a cardinality change. In these embodiments, a drainable termination method may be identified at 502B for gracefully terminating one or more database sessions of a victim database instance. A drainable termination method may give a database session an opportunity to complete its execution of transaction(s), and then terminate the database session after the database session completes the execution of transaction(s). In some of these embodiments, a drainable termination method may wait for the database session to execute and complete its transaction(s) within a threshold period time beyond which a different termination more aggressive or invasive than the drainable termination method may be applied.

A determination may be made at 504B to decide whether a first set of one or more database sessions to which the drainable termination method applies exists. A drainable termination method is the less aggressive or invasive termination method than planned and forced failover termination method as well as the forcible termination method.

In some embodiments, a planned failover termination method may be identified at 506B for moving one or more database sessions of a victim database instance to another database instance at a desired or planned time. A determination may be made at 508B to decide whether a second set of one or more database sessions to which the planned failover termination method applies exists. A planned failover termination method is more aggressive or invasive than the drainable termination method but less aggressive or invasive than the forced failover termination method and the forcible termination method.

In some embodiments, a forced failover termination method may be identified at 510B for forcibly moving one or more database sessions of a victim database instance to another database instance upon the execution of the forced failover termination method. A database session may not be subject to a planned failover termination method for many reasons. For example, a database session may be in the midst of certain database workload activity and is thus unable to stop handling workload, services, and/or requests on behalf of a requesting client. In this example, after waiting for a designated or threshold time period, the system may choose to force the database session to another database instance.

A determination may be made at 512B to decide whether a third set of one or more database sessions to which the forced failover termination method applies exists. A forced failover termination method is more aggressive or invasive than the drainable termination method or the planned failover termination method but less aggressive or invasive than the forcible termination method.

In some embodiments, a kill or forcible termination method may be identified at 514B for forcibly terminating one or more database sessions of a victim database instance. In some embodiments, after waiting for a designated or threshold time period or after analyzing these one or more database sessions for one or more less aggressive or invasive termination methods, the system may choose to forcibly kill these one or more database sessions.

A determination may be made at 516B to decide whether a fourth set of one or more database sessions to which the kill or forcible termination method applies exists. A kill or forcible termination method is more aggressive or invasive than the drainable termination method, the planned failover termination method, and the forced failover termination method.

As described herein, terminating database sessions in a victim database instance may or may not examine all of the available termination methods described herein. Some embodiments may have a default termination method such as a forced failover termination method because moving a database session is not costly due to the fact that a database session may be stateless. Some other embodiments may explore more than one but not all of the aforementioned termination methods and opt for the forcible kill termination method when the one or more (but not all) termination methods do not produce desired result.

System Architecture

Figure 6:
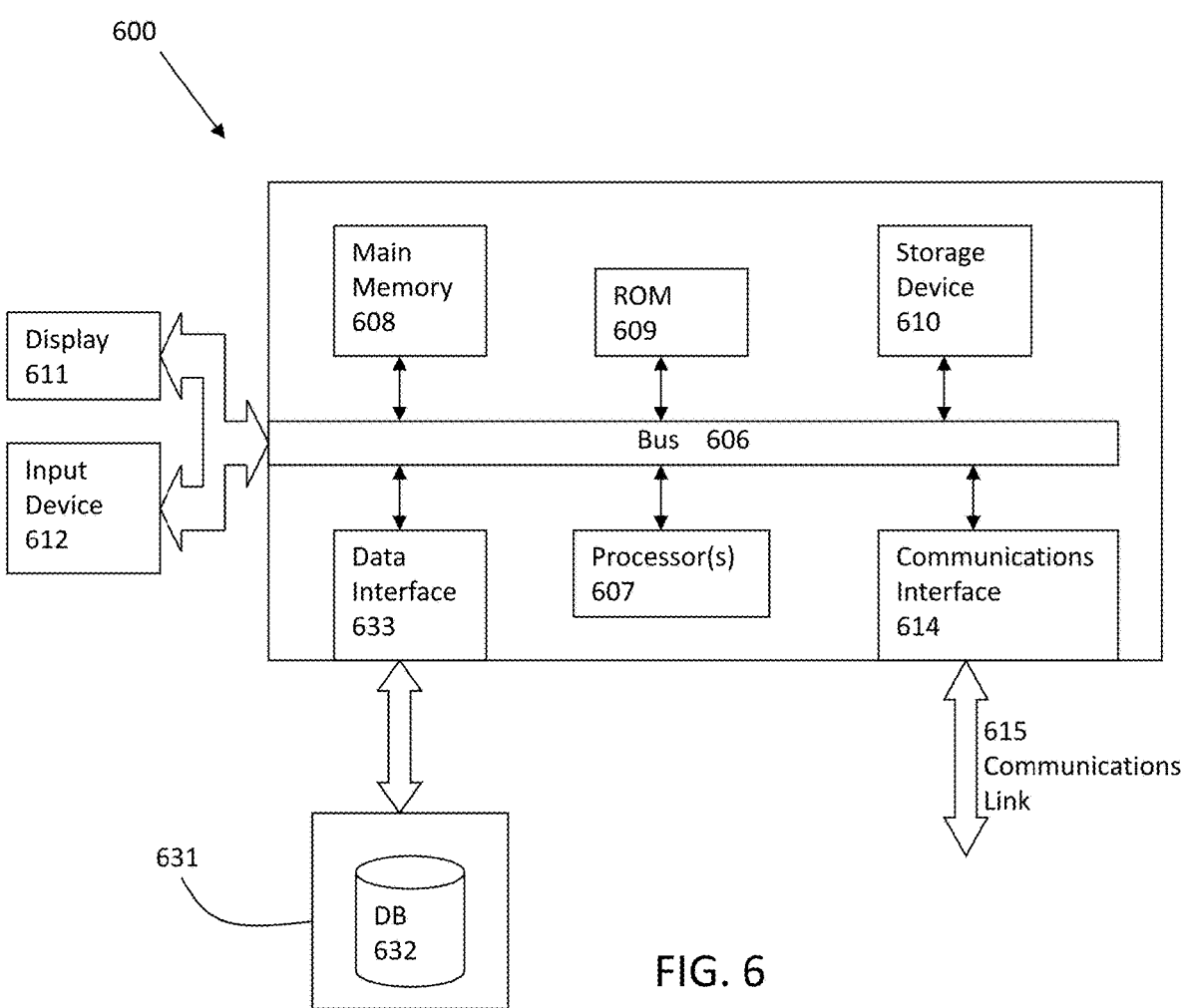
FIG. 6 is a block diagram of one or more components of a system environment in which services may be offered as cloud services, in accordance with an embodiment of the present invention.

FIG. 6 is a block diagram of one or more components of a system environment in which services may be offered as cloud services, in accordance with an embodiment of the present disclosure. Computer system 600 includes a bus 606 or other communication mechanism for communicating information, which interconnects subsystems and devices, such as processor 607, system memory 608 (e.g., RAM), static storage device 609 (e.g., ROM), disk drive 610 (e.g., magnetic or optical), communication interface 614 (e.g., modem or Ethernet card), display 611 (e.g., CRT or LCD), input device 612 (e.g., keyboard), and cursor control.

According to some embodiments of the invention, computer system 600 performs specific operations by processor 607 executing one or more sequences of one or more instructions contained in system memory 608. Such instructions may be read into system memory 608 from another computer readable/usable medium, such as static storage device 609 or disk drive 610. In alternative embodiments, hard-wired circuitry may be used in place of or in combination with software instructions to implement the invention. Thus, embodiments of the invention are not limited to any specific combination of hardware circuitry and/or software. In some embodiments, the term "logic" shall mean any combination of software or hardware that is used to implement all or part of the invention.

The term "computer readable medium" or "computer usable medium" as used herein refers to any medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 600. According to other embodiments of the invention, two or more computer systems 600 coupled by communication link 610 (e.g., LAN, PTSN, or wireless network) may perform the sequence of instructions required to practice the invention in coordination with one another.

Computer system 600 may transmit and receive messages, data, and instructions, including program, i.e., application code, through communication link 615 and communication interface 614. Received program code may be executed by processor 607 as it is received, and/or stored in disk drive 610, or other non-volatile storage for later execution. A database 632 in a storage medium 631 may be used to store data accessible by the system 600.

The techniques described may be implemented using various processing systems, such as clustered computing systems, distributed systems, and cloud computing systems. In some embodiments, some or all of the data processing system described above may be part of a cloud computing system. Cloud computing systems may implement cloud computing services, including cloud communication, cloud storage, and cloud processing.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method comprising:

identifying a change in a cardinality of a database;

assigning a new database session to a database instance of the database based at least in part upon the change in the cardinality of the database;

determining one or more co-located database sessions for at least one database instance of multiple database instances, using a checker process for the database, wherein the checker process comprises a plurality of local checker processes each of which receives local data from each database instance of the plurality of database instances to provide each database instance with a global view of the plurality of database instances, at least one of the plurality of local checker processes detects, using the local data collected from the plurality of database instances, whether more than one database instance in the plurality of database instances has at least one co-located database session of the plurality of co-located database sessions, a co-located database session includes a database session that has been tagged to co-execute on a same computing node while the database session can execute on the same computing node or on a different computing node, and the co-located database session is tagged either before the change in the cardinality of the database occurs or after the change occurs;

identifying, based at least in part upon a co-location data structure, multiple database instances of a plurality of database instances in the database that have the same co-location tag as the new database session and that respectively have one or more co-located database sessions of a plurality of co-located database sessions, wherein the co-location data structure stores therein an n-tuple that further comprises a first information pertaining to a database instance of the plurality of database instances and a second information pertaining to hashing of a co-location tag, and the co-location tag comprises a parameter that is used with a connect tag parameter to route co-located database sessions having the co-location tag to a single database instance of the plurality of database instances; and terminating at least one co-located database session of at least one database instance of the multiple database instances.

2. The method of claim 1, wherein the checker process is a single centralized checker process that detects, using global data collected from the plurality of database instances, whether two or more database instances of the plurality of database instances have at least one co-located database session of the plurality of co-located database sessions, and the cardinality includes a total count of database instances in a database cluster for the database.

3. The method of claim 1, further comprising:

labeling, marking, or tagging the one or more co-located database sessions for the at least one database instance of the multiple database instances, wherein each co-located database session of the one or more co-located database sessions is labeled, marked, or tagged with information pertaining to a respective termination method, which, when executed, terminates respective co-located database sessions.

4. The method of claim 1, wherein the termination method for a specific co-location database session is determined by performing at least two of:

analyzing the at least one database instance to determine whether the graceful termination method applies;

analyzing the at least one database instance to determine whether the planned failover termination method applies;

analyzing the at least one database instance to determine whether the forced failover termination method applies; and analyzing the at least one database instance to determine whether the forcible termination method applies.

5. The method of claim 3, wherein respective termination methods for respective co-located database sessions are determined or selected from a plurality of different termination methods comprising:

a graceful kill termination method, a planned failover termination method, a forced failover termination method, and a forcible termination method.

6. A system, comprising:

a processor or processor core; and a memory for holding programmable code which, when executed, causes the processor or processor core to perform a set of acts, the set of acts comprising:

identifying a change in a cardinality of a database;

assigning a new database session to a database instance of the database based at least in part upon the change in the cardinality of the database;

determining one or more co-located database sessions for at least one database instance of multiple database instances, using a checker process for the database, wherein the checker process comprises a plurality of local checker processes each of which receives local data from each database instance of the plurality of database instances to provide each database instance with a global view of the plurality of database instances, at least one of the plurality of local checker processes detects, using the local data collected from the plurality of database instances, whether more than one database instance in the plurality of database instances has at least one co-located database session of the plurality of co-located database sessions, a co-located database session includes a database session that has been tagged to co-execute on a same computing node while the database session can execute on the same computing node or on a different computing node, and the co-located database session is tagged either before the change in the cardinality of the database occurs or after the change occurs;

identifying, based at least in part upon a co-location data structure, multiple database instances of a plurality of database instances in the database that have the same co-location tag as the new database session and that respectively have one or more co-located database sessions of a plurality of co-located database sessions, wherein the co-location data structure stores therein an n-tuple that further comprises a first information pertaining to a database instance of the plurality of database instances and a second information pertaining to hashing of a co-location tag, and the co-location tag comprises a parameter that is used with a connect tag parameter to route co-located database sessions having the co-location tag to a single database instance of the plurality of database instances; and terminating at least one co-located database session of at least one database instance of the multiple database instances.

7. The system of claim 6, wherein the checker process is a single centralized checker process that detects, using global data collected from the plurality of database instances, whether more than one database instance of the plurality of database instances has at least one co-located database session of the plurality of co-located database sessions.

8. The system of claim 6, wherein the memory holding the programmable code which, when executed, causes the processor or processor core to perform the set of acts, the set of acts further comprising:

labeling, marking, or tagging the one or more co-located database sessions for the at least one database instance of the multiple database instances, wherein each co-located database session of the one or more co-located database sessions is labeled, marked, or tagged with information pertaining to a respective termination method, which, when executed, terminates respective co-located database sessions.

9. The system of claim 8, wherein respective termination methods for respective co-located database sessions are determined or selected from a plurality of different termination methods comprising:

a graceful kill termination method, a planned failover termination method, a forced failover termination method, and a forcible termination method.

10. The system of claim 9, wherein the system determines the termination method for a specific co-location database session by performing at least two of:

analyzing the at least one database instance to determine whether the graceful termination method applies;

analyzing the at least one database instance to determine whether the planned failover termination method applies;

analyzing the at least one database instance to determine whether the forced failover termination method applies; and analyzing the at least one database instance to determine whether the forcible termination method applies.

11. A non-transitory physical computer readable medium having stored thereon a sequence of instructions which, when executed by a processor or processor core, causes the processor or processor core to perform a set of acts, the set of acts comprising:

identifying a change in a cardinality of a database;

assigning a new database session to a database instance of the database based at least in part upon the change in the cardinality of the database;

determining one or more co-located database sessions for at least one database instance of multiple database instances, using a checker process for the database, wherein the checker process comprises a plurality of local checker processes each of which receives local data from each database instance of the plurality of database instances to provide each database instance with a global view of the plurality of database instances, at least one of the plurality of local checker processes detects, using the local data collected from the plurality of database instances, whether more than one database instance in the plurality of database instances has at least one co-located database session of the plurality of co-located database sessions, a co-located database session includes a database session that has been tagged to co-execute on a same computing node while the database session can execute on the same computing node or on a different computing node, and the co-located database session is tagged either before the change in the cardinality of the database occurs or after the change occurs;

identifying, based at least in part upon a co-location data structure, multiple database instances of a plurality of database instances in the database that have the same co-location tag as the new database session and that respectively have one or more co-located database sessions of a plurality of co-located database sessions, wherein the co-location data structure stores therein an n-tuple that further comprises a first information pertaining to a database instance of the plurality of database instances and a second information pertaining to hashing of a co-location tag, and the co-location tag comprises a parameter that is used with a connect tag parameter to route co-located database sessions having the co-location tag to a single database instance of the plurality of database instances; and terminating at least one co-located database session of at least one database instance of the multiple database instances.

12. The non-transitory-physical computer readable medium of claim 11, wherein the checker process is a single centralized checker process that detects, using global data collected from the plurality of database instances, whether more than one database instance of the plurality of database instances has at least one co-located database session of the plurality of co-located database sessions.

13. The non-transitory-physical computer readable medium of claim 11 having stored thereupon the sequence of instructions which, when executed by the processor or processor core, causes the processor or processor core to perform the set of acts, the set of acts further comprising:

labeling, marking, or tagging the one or more co-located database sessions for the at least one database instance of the multiple database instances, wherein each co-located database session of the one or more co-located database sessions is labeled, marked, or tagged with information pertaining to a respective termination method, which, when executed, terminates respective co-located database sessions.

14. The non-transitory-physical computer readable medium of claim 13, wherein respective termination methods for respective co-located database sessions are determined or selected from a plurality of different termination methods comprising:

a graceful kill termination method, a planned failover termination method, a forced failover termination method, and a forcible termination method.

15. The non-transitory-physical computer readable medium of claim 14, wherein the termination method for a specific co-location database session is determined by performing at least two of:

analyzing the at least one database instance to determine whether the graceful termination method applies;

analyzing the at least one database instance to determine whether the planned failover termination method applies;

analyzing the at least one database instance to determine whether the forced failover termination method applies; and analyzing the at least one database instance to determine whether the forcible termination method applies.

* * * * *